US005230066A

United States Patent [19]

Morimi

[11] Patent Number: 5,230,066

[45] Date of Patent: Jul. 20, 1993

[54] MICROCOMPUTER

[75] Inventor: Yoichi Morimi, Itami, Japan

[73] Assignee: Mitsubishi Denki Kabushiki Kaisha, Tokyo, Japan

[21] Appl. No.: 860,108

[22] Filed: Mar. 30, 1992

Related U.S. Application Data

[63] Continuation of Ser. No. 445,893, Dec. 1, 1989, abandoned, which is a continuation of Ser. No. 96,686, Sep. 15, 1987, abandoned.

[30] Foreign Application Priority Data

Sep. 19, 1986 [JP] Japan ............................... 61-222874

[51] Int. Cl.[5] ............................................ G06F 3/14

[52] U.S. Cl. ................................. 395/166; 395/164; 395/165; 395/144; 340/750

[58] Field of Search ............... 395/164, 165, 166, 145, 395/162, 144; 340/797, 750, 798, 799; 400/83, 63

[56] References Cited

U.S. PATENT DOCUMENTS

| | | | |
|---|---|---|---|
| 4,005,390 | 1/1977 | Findley | 340/172.5 |
| 4,129,858 | 12/1978 | Hara | 340/324 |
| 4,199,757 | 4/1980 | Ichimi | 340/750 |
| 4,232,376 | 11/1980 | Dion et al. | 365/222 |
| 4,481,511 | 11/1984 | Hanmura et al. | 340/752 |
| 4,486,856 | 12/1984 | Heckel et al. | 364/900 |
| 4,623,978 | 11/1986 | Aoki | 364/519 |
| 4,660,029 | 4/1987 | Houda et al. | 340/744 |
| 4,679,038 | 7/1987 | Bantz et al. | 340/721 |
| 4,823,288 | 4/1989 | Ueno et al. | 395/145 |
| 4,841,478 | 6/1989 | Takahashi | 395/145 |
| 4,937,743 | 6/1990 | Rassman et al. | 364/401 |
| 4,984,162 | 1/1991 | Torii et al. | 395/145 |

FOREIGN PATENT DOCUMENTS 57-70593 3/1982 Japan .

*Primary Examiner*—Phu K. Nguyen
*Attorney, Agent, or Firm*—Townsend and Townsend

[57] ABSTRACT

A display controller includes a display memory having capacity for storing first and second memory lines of a display. A controller interrupts a CPU after each line is displayed so that the CPU writes a subsequent line to be displayed to the memory line whose data has just been displayed. The interrupt includes pointer information identifying which line has just been displayed and which line must be written to display memory by the CPU.

2 Claims, 7 Drawing Sheets

D: Display line pointer signal

F: 1-line-display end signal

Fig 3

| high order address \ low order address | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 8 | 9 | A | B | C | D | F | F |

| high order address \ low order address | 0 | 1 | 2 | 3 | 4 | 5 | 6 | 7 |
|---|---|---|---|---|---|---|---|---|
| 0 | G | H | I | J | K | L | M | N |
| 1 | 8 | 9 | A | B | C | D | E | F |

| high order address \ low order address | 0 | 1 | 2 | 3 | 4 | 5 | 6 | 7 |
|---|---|---|---|---|---|---|---|---|
| 0 | G | H | I | J | K | L | M | N |
| 1 | Ø | P | Q | R | S | T | U | V |

Fig 7 PRIOR ART

| address | 0 | 1 | 2 | 3 | 4 | 5 | 6 | 7 | Display line pointer |
|---|---|---|---|---|---|---|---|---|---|
| | 00 | 01 | 02 | 03 | 04 | 05 | 06 | 07 | 0 |
| | 10 | 11 | 12 | 13 | 14 | 15 | 16 | 17 | 1 |
| | 20 | 21 | 22 | 23 | 24 | 25 | 26 | 27 | 2 |
| | 30 | 31 | 32 | 33 | 34 | 35 | 36 | 37 | 3 |

MICROCOMPUTER

This is a continuation of application Ser. No. 07/445,893 filed Dec. 1, 1989, now abandoned which is a continuation of application Ser. No. 096,686, filed Sep. 15, 1989, now abandoned.

BACKGROUND OF THE INVENTION

1. Field of the Invention

The present invention relates to a microcomputer, and more particularly to that including therein a display controller for displaying characters and symbols, etc., on a display unit using a cathode-ray tube and the like in a raster scan system.

2. Description of the Prior Art

FIG. 4 is a block diagram illustrating a basic arrangement of a prior microcomputer including therein a display controller.

As shown in the figure, a CPU 1 of the microcomputer controls input/output of encoded character data into/out of a display refresh memory 9.

A basic controller 3 has a pointer (not shown) indicative of a line now in display, and issues an address signal for accessing the display refresh memory 9 in synchronism with a timing signal in need of display control and in synchronism with horizontal and vertical sync. signals HD and VD of raster scanning in a display unit (not shown).

Designated at 9 is the display refresh memory, in which codes of characters and symbols are respectively stored at one address per character. Designated at 5 is a character pattern generator circuit, that reads a pattern memory (not shown) in which a dot pattern comprising characters and symbols is stored, with use of codes of those characters and symbols as address, and that generates a character dot pattern.

Likewise, designated ht 4 is an address controller which issues an address signal to thereby read a character code from the display refresh memory 9, the character code serving as an address in the pattern memory of the character pattern generator circuit 5 to permit a dot pattern of that character to be generated.

Designated at 6 is an output controller (display controller), which issues the character dot pattern so read from the character pattern generator circuit 5 in the form of a bit serial video signal displayed by a raster scan system in accordance with a timing signal from the basic controller 3.

FIG. 5 is a block diagram illustrating a prior arrangement of the address controller 4 of FIG. 4. As shown in the figure, designated at 7 is an address counter, and 8 is a coincidence circuit. Likewise, designated at A is a constant, B is a clear signal for the address counter 7, C is an incremental signal for the same, D is a display line pointer signal in the basic controller 3 for determining high order bits of an address signal, and E is an 1-scan-display end signal.

FIG. 6 illustrates an exemplary display yielded by the control of the address controller of FIG. 5 which demonstrates a character in a matrix form of 4 lines×8 rows.

FIG. 7 illustrates addresses in the display refresh memory 9 employed correspondingly to the display of FIG. 6.

In succession, the circuit of FIG. 5 will be described with reference to FIGS. 4 to 7. Prior to operation of any display, codes of characters(in the present example, 32 characters of "0" to "9" and "A" to "V") displayed on a screen are all stored in the display refresh memory 9 at corresponding addresses (in this example, "0" to "37") with the aid of the CPU 1. First, the address counter 7 is cleared to "0" by a signal B from the basic controller 3, which has detected a display position on a 1st line to provide "0" to the low order of an address signal and "0" of a value of a display line pointer indicative of the first line to the high order of a character "0" of the same, and thus a code of a character "0" at an address "00" in the display refresh memory 9, i.e., at the first line and first row is read. Contents in the address counter 7 are incremented by a numerical value "1" at a timeby the signal C for each character to change to "00", "01", "02",... ( in decimal rotation. the same shall apply hereinafter.).

While, the constant A, which determines an end address, is "7" in this example, and hence a coincidence circuit 8 provides the 1-scan-display end signal E from the address counter 7 to the basic controller 3 when the low order address signal changes to "7". The contents in the address counter 7 are cleared by the signal B to return to "0". With this situation repeated by the number of raster scan lines which constitute one line, the display on the 1st line is finished. The signal D remains unchanged for that time, i.e., "0". In succession, when the basic controller 3 detects a display position on the 2nd line, the address counter 7 is again cleared by the signal B to "0", and a character code of a character 8 stored at an adress 10 is read from the display refresh memory 9, since the signal D has changed to "1", a value of a line display pointer on the second line. In addition, the address counter 7 is incremented by the signal C for each character. When the address signal from the address counter 7 changes to "7", a value of the constant A, the coincidence circuit 8 provides the 1-scan-end signal E. With this situation repeated by the number of raster scan lines, which constitute one line, the display on the second line is finished. With this operation repeated for the third line, fourth line and so on in succession, a display over one screen is achieved.

Accordingly, when a character or a pattern of 4 lines×8 rows is displayed with the prior arrangement, 32 display refresh memories are required.

PROBLEMS TO BE SOLVED BY THE INVENTION

However, according to the prior microcomputer including a display controller therein,.as described above, each character to be displayed is stored in a display refresh memory having an address corresponding to a display position thereof, and hence when many characters extending over a plurality of lines are displayed, many display refresh memories are correspondingly required to result in a chip area of the associated microcomputer being increased.

SUMMARY OF THE INVENTION

In view of the drawbacks of the prior arts, it is an object of the present invention to provide a microcomputer including a display controller which is capable of displaying plenty of characters with use of display refresh memories corresponding to two lines.

To achieve the above object, a microcomputer according to the present invention includes:

(a) a character pattern generator for generating a dot pattern indicative of a character corresponding to a character code read from a display refresh memory;

(b) a display controller for displaying the dot pattern so generated in a raster scan system;

(c) display refresh memories, each being rewritable by a CPU in a microcomputer and having a capacity required for a display extending over two lines;

(d) a basic controller having a function of transmitting pointer information to said CPU, said pointer information indicating what a line presently participating in the display is;

(e) read address switching means for switching, for each end of 1-line display, read addresses in said display refresh memory to addresses of a line in which the CPU has written until the associated interruption occurs;

(f) interruption means for generating an interruption to the CPU for each end of 1-line display, said interruption instructing that a character to be displayed on the next line is written at an address of a line for which the associated display has been finished.

The above and other objects, features, and advantages of the invention will become more apparent from the following description when taken in conjunction with the accompanying drawings.

BRIEF DESCRIPTION OF THE DRAWINGS

FIG. 3 is views each illustrating addresses in a 2-line display refresh memory, the embodiment of the present invention, those views corresponding to a display in FIG. 6;

FIG. 7 is a view illustrating addresses in a prior display refresh memory, the view corresponding to that in FIG. 6.

DESCRIPTION OF THE PREFERRED EMBODIMENT

In what follows, an embodiment of a microcomputer according to the present invention will be described.

Figure 1:
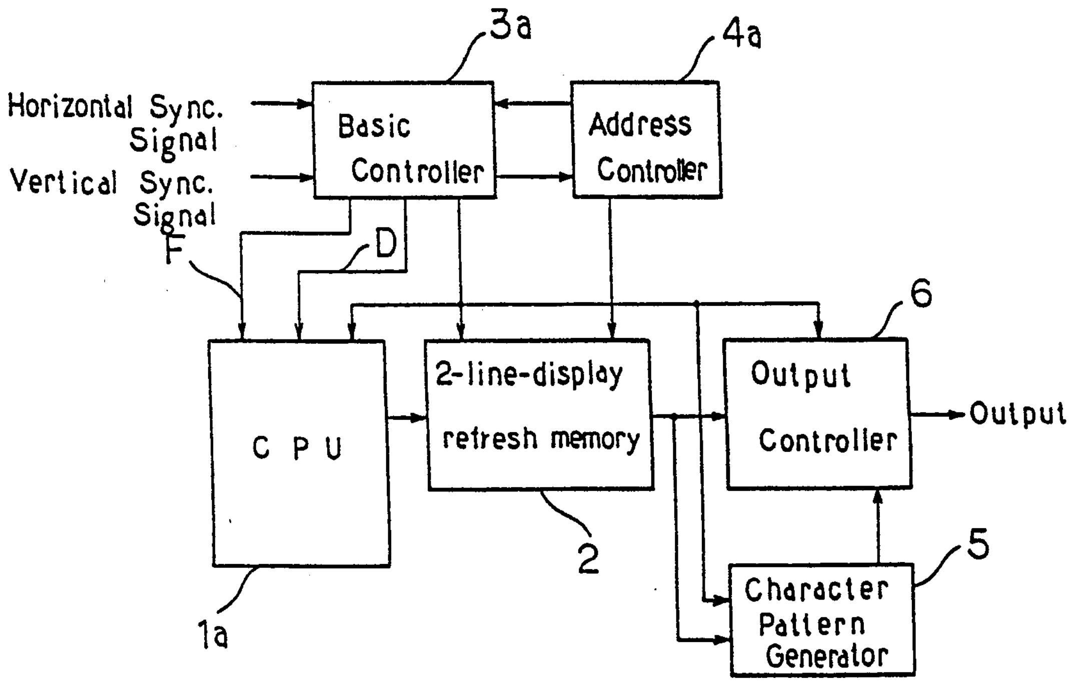
FIG. 1 is a block diagram illustrating a basic arrangement of an embodiment of a microcomputer according to the present invention.
Figure 2:
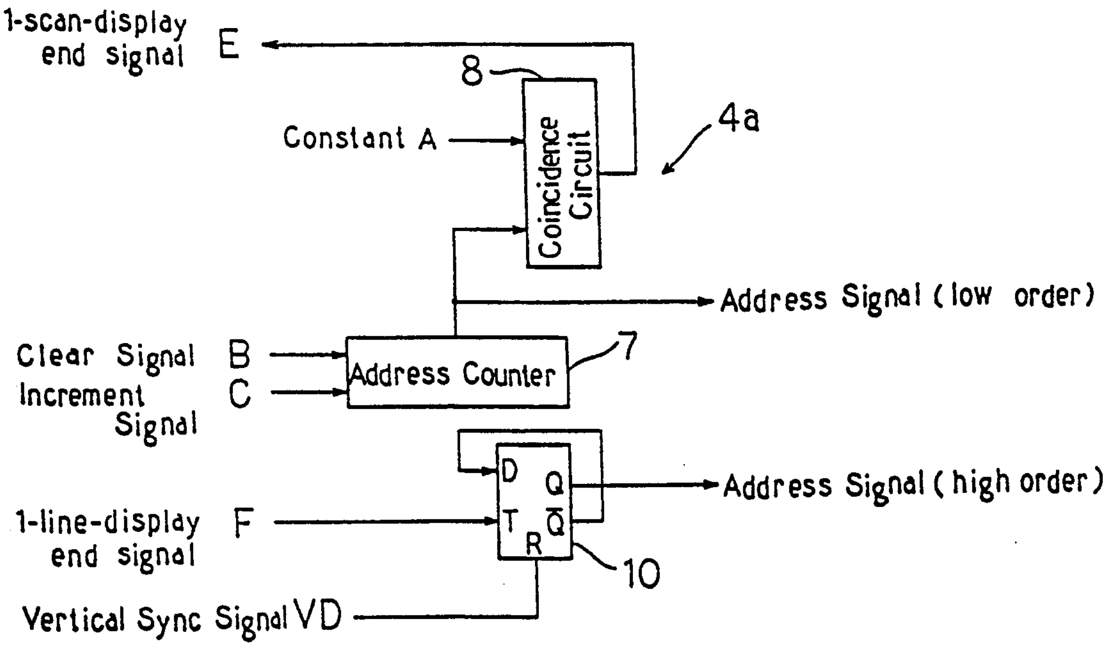
FIG. 2 is a block diagram illustrating an address controller shown in FIG. 1.
Figure 4:
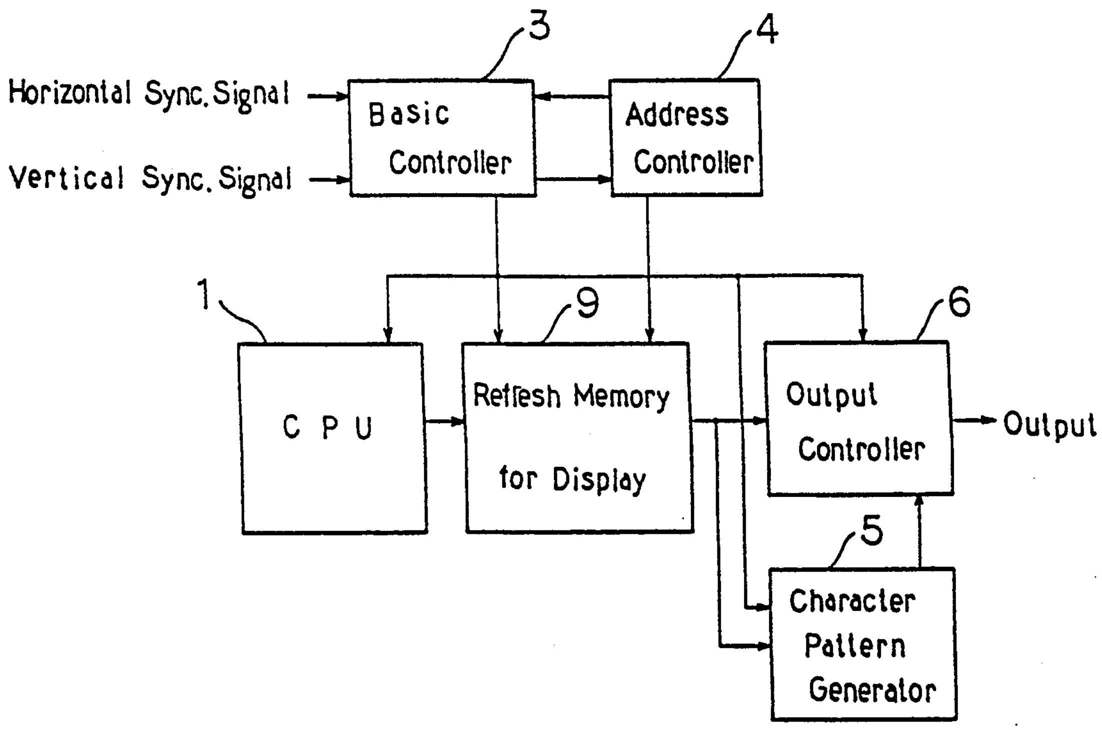
Fig 4 PRIOR ART
FIG. 4 is a block diagram illustrating a basic arrangement of a prior display unit.
Figure 5:
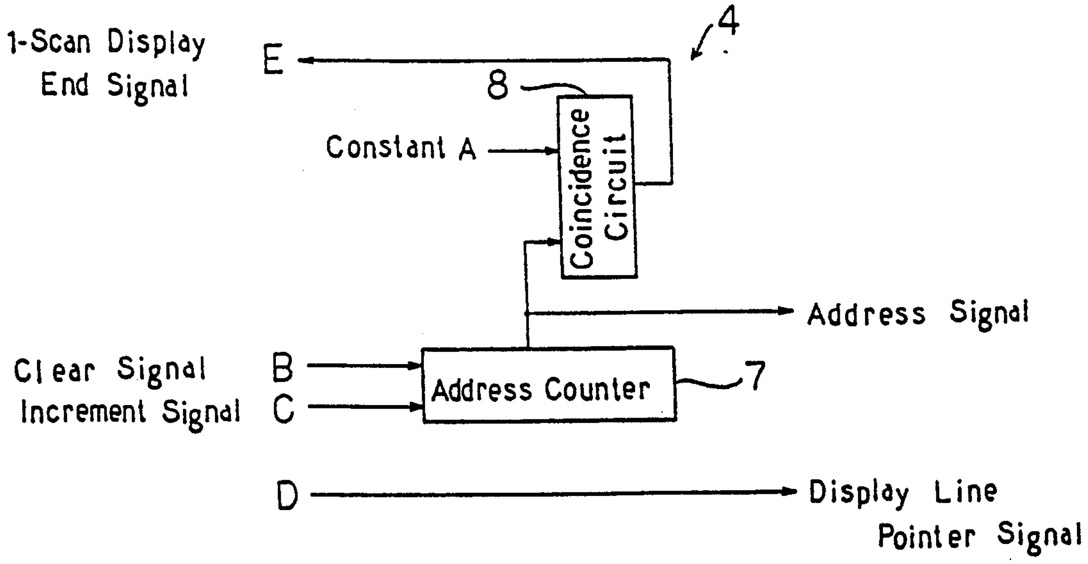
Fig 5 PRIOR ART
FIG. 5 is a circuit block diagram illustrating a prior address controller shown in FIG. 4.

FIGS. 1 and 2 are block diagrams respectively illustrating a microcomputer, an embodiment of the present invention, wherein the same symbols as those in FIGS. 4 and 5 shall apply to the same or corresponding portions, and the same alphabet apply to the same signal.

As shown in FIG. 1, designated at 2 is a 2-line-display refresh memory having a capacity sufficient to display two lines, and 3a is a basic controller including interruption means and pointer information transmission means, the basic controller having, besides conventional functions, a function of generating an interruption to a CPU 1a for each end of 1-line display, the interruption instructing that a character code to be displayed on the nextline is written at addresses in a line which has already ended the associated display, as well as a function of informing the CPU 1a of pointer information of what a line displaying at present is.

In addition, designated at 4a is an address controller (read address switching means), which switches, for each end of 1-line display, a read address in the display refresh memory to an address in the line in which the CPU 1a has written any data till interruption by the CPU 1a. Moreover, designated at F is a signal to provide an interruption from the basic controller 3 to the CPU 1a after the end of the 1-line display, and D is the same signal as in FIG. 4 indicative of a line now in display.

Figure 6:
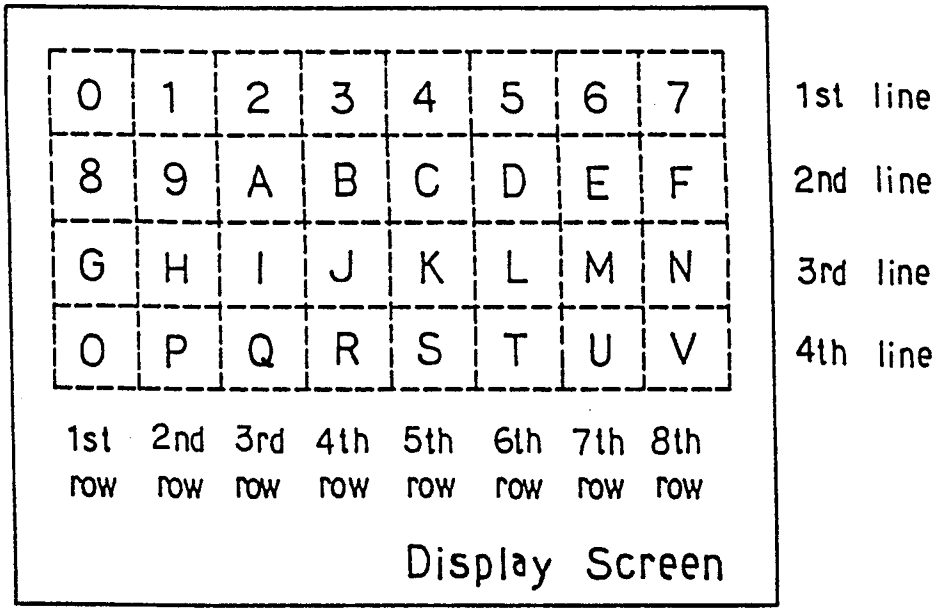
Fig 6 PRIOR ART
FIG. 6 is a view illustrating an exemplary display demonstrated by circuit control in FIG. 1 or 4.

Furthermore, as shown in FIG. 2, designated at F is an 1-line display end signal, and 10 is a toggle circuit which is reversed by the signal F. FIG. 3 illustrates, upon effecting the display shown in FIG. 6, corresponding addresses in the 2-line-display memory 2.

Successively, operation of the circuits shown in FIGS. 1 and 2 will be described.

First, character codes of characters "0" to "9" and "A" to "F" displayed respectively on the first and second lines are, prior to a display thereof, stored at corresponding addresses "00" to "07", and "10" to "17" in the 2-line-display refresh memory 2 with the aid of the CPU 1a. An address counter 7 is cleared to "0" by a signal B from the basic controller 3 which has detected a display position on the first line, to thereby permit a character code of a character "0" stored in the 2-line-display refresh memory 2 at an address "00" thereof to be read. The address counter 7 is incremented by "1" at a time in its contents for each character by the signal C, and a coincidence circuit 8 transmits a display-end signal E to the basic controller 3a when an address signal from the address counter 7 reaches a value "7" of the constant A. Hereby, the address counter 7 is cleared by the signal B to return to "0". With repetition of this operation by the number of raster scan lines which constitute one line of the 2-line-display refresh memory 2, the display over the one line is finished.

Thereupon, the basic controller 3a issues an 1-line-display end signal F to provide an interruption to the CPU, whereby the toggle circuit 10 is reversed to permit the display to be changed to the second line. Character codes of characters "8" to "F" stored in the display refresh memory 2 at addresses "10" to "17" therein are thus read for display thereof in the same manner as in the first line. The CPU 1a, as receiving the interruption signal F, stores character codes "G" to "N" to be displayed on the third line in the display refresh memory 2 at addresses "00" to "07" therein, during its display operation for characters stored in the display memory 2 at addresses "10" to "17" therein.

The CPU 1a, after the end of the display for the second line, stores, likewise, character codes of characters "0" to "V" to be displayed on the fourth line in the display memory 2 at addresses "10" to "17" therein. FIG. 3 illustrates a change of the display refresh memory 2 caused by the operation described above. A display over one display screen is achieved in such a manner.

The aforementioned operation is a case with no interval betw en the successive lines, and when there is any interval between the successive lines, the CPU may write the associated data in the display refresh memory 2 within a period of the one-line display and within a time interval between successive two lines.

In the arrangement of the present invention, in case of a display of, for example, 4 lines×8 rows, 32 refresh memories, which were conventionally required, may be reduced to 16 for the 2-line display to halve an area of a display memory occupying a chip area.

Furthermore, although in the aforementioned embodiment a 4-line display was described for brevity, the present invention is, as a matter-of course, applicable to any display of 4 lines or more. That is, the present invention is more effective for displays in great quantities extending over many lines.

According to the microcomputer of the present invention, as described above, the display refresh memory was arranged for two lines, whereby a chip area thereof can be reduced and the cost thereof can go down.

What is claimed is:

1. An improved microcomputer, including a display memory having only two lines, for generating a multiline character display comprising:

a display memory having only first and second line storage areas for providing characters in the form of character codes to be displayed stored in said first line area when a first address is received to select said second line storage area and for providing characters int he form of said character codes to be displayed stored in said second line area when a second address is received to select said first line storage area so that one of said line storage areas is a selected line storage area and the other one is an unselected line storage area at a given time;

a character pattern generator, coupled to receive the characters provided by said display memory, for converting said character codes into bit patterns for display output;

a controller comprising an address counter which is incremented by one every completion of display of one character of one line on a display device and a coincidence circuit for comparing an output value of this address counter with a predetermined value and for generating an interrupt signal when the output value is equal to the predetermined value;

a toggle circuit, having an input coupled to receive the interrupt signal from said controller and an output for transmitting said first and second address signals to said display memory, for alternately selecting said first and second line storage areas in response to said interrupt signal provided by said controller; and a CPU, that receives said interrupt signal and pointer, for writing, in response to said interrupt signal provided by said controller, the next line of characters of said multi-line display to be displayed to the unselected line storage area of said display memory that is not currently providing characters being displayed.

2. An improved microcomputer, including a display memory having only two lines, for generating a multiline character display comprising:

a display memory having only first and second line storage areas for providing characters in the form of character codes to be displayed stored in said first line area when a first address is received to select said second line storage area and for providing characters in the form of said character codes to be displayed stored in said second line area when a second address is received to select said first line storage area so that one of said line storage areas is a selected line storage area and the other one is an unselected line storage area at a given time;

a character pattern generator, coupled to receive the characters provided by said display memory, for converting said character codes into bit patterns for display output;

a controller comprising an address counter which is incremented by one in direct response to every completion of display of one character of one line on a display device and a coincidence circuit for comparing an output value of this address counter with a predetermined value and for generating an interrupt signal when these values correspond;

a toggle circuit, having an input coupled to receive the interrupt signal from said controller and an output for transmitting said first and second address signals to said display memory, for alternately selecting said first and second line storage areas in response to said interrupt signal provided by said controller; and a CPU, that receives, at the same time, said interrupt signal and pointer, for writing, in response to said interrupt signal provided by said controller, the next line of characters of said multi-line display to be displayed to the unselected line storage area of said display memory that is not currently providing characters being displayed.

* * * * *